June 29, 1965
R. S. SCHULTZ ETAL
3,191,809
PRESSURIZED CONTAINER HAVING A PLURALITY OF SELECTIVELY ATTACHABLE NOZZLES
Filed Dec. 29, 1961
2 Sheets-Sheet 1
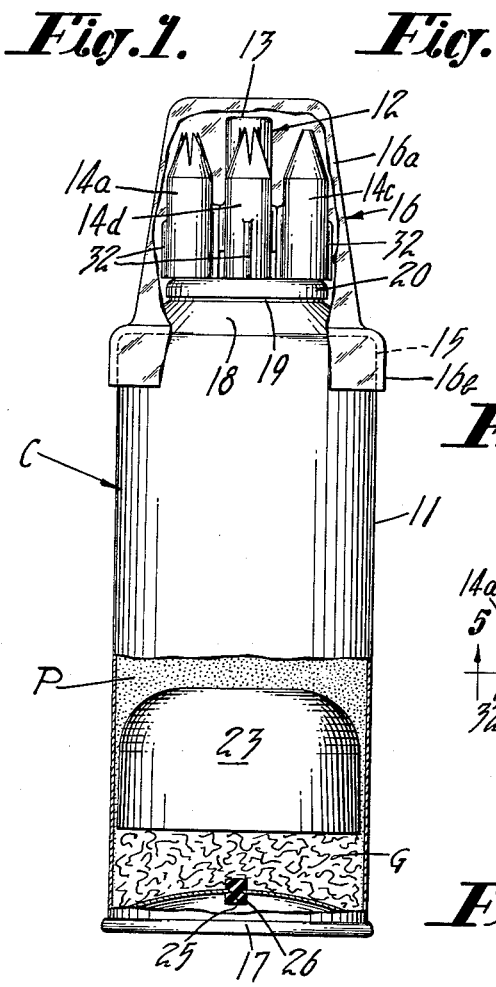
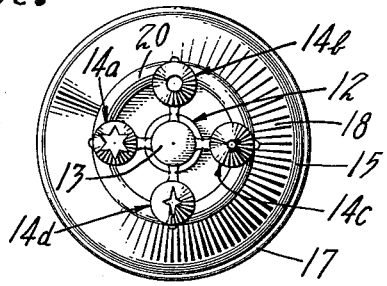
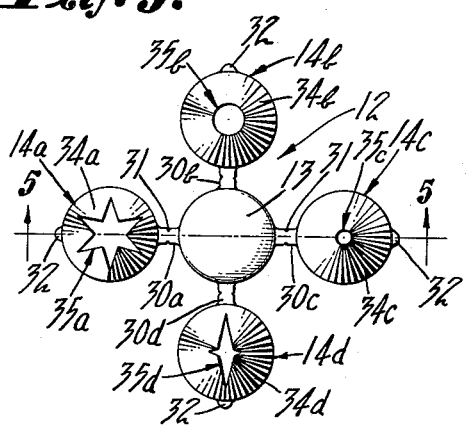
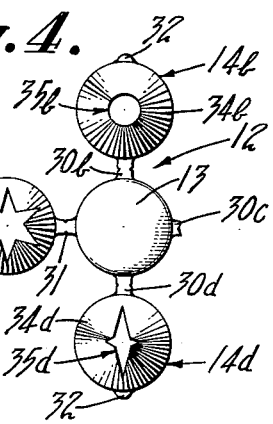
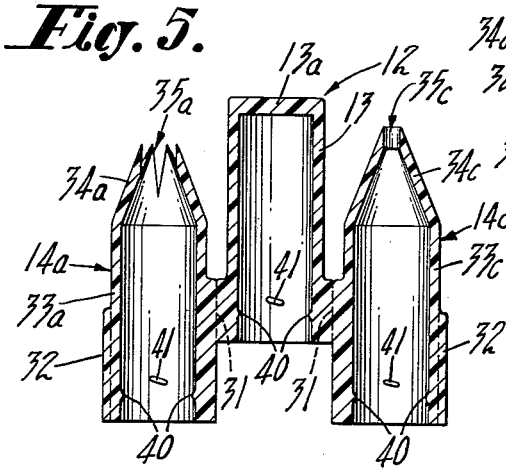
INVENTORS
ROBERT STEPHEN SCHULTZ
ROSS ARMSTRONG EASTER
BY Bertram K. Clarbor
George W. Reiber
ATTORNEYS

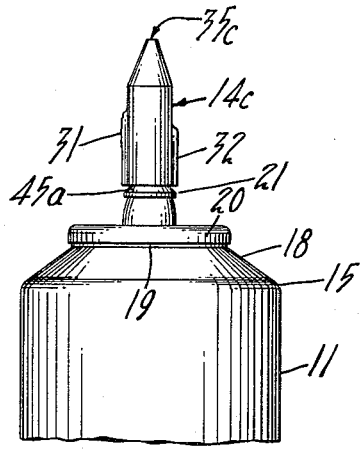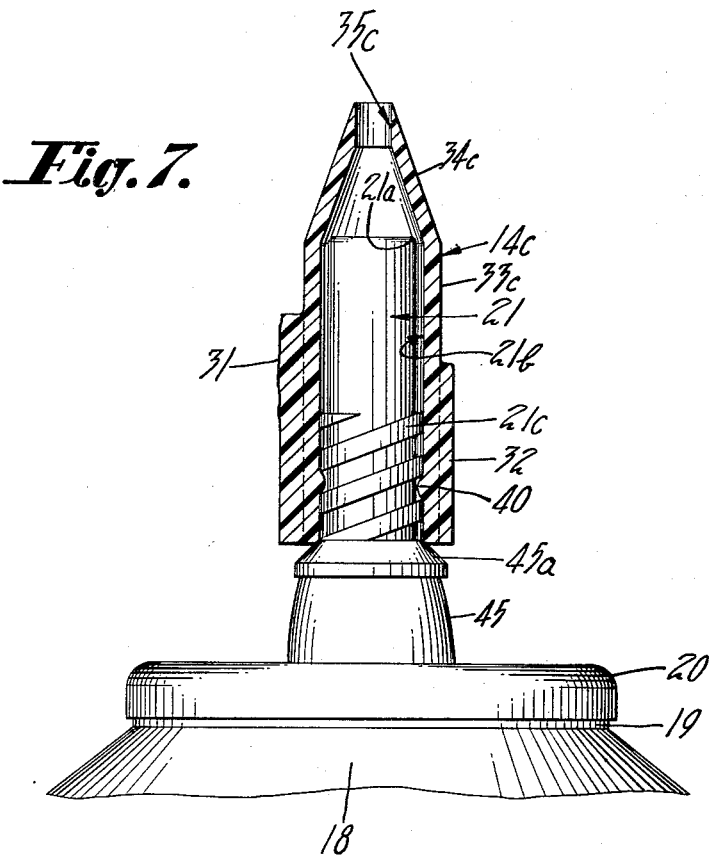

United States Patent Office 3,191,809
Patented June 29, 1965

3,191,809
PRESSURIZED CONTAINER HAVING A PLURALITY OF SELECTIVELY ATTACHABLE NOZZLES
Robert Stephen Schultz, Somerville, N.J., and Ross Armstrong Easter, Minneapolis, Minn., assignors, by mesne assignments, of one-half to The Pillsbury Company, Minneapolis, Minn., a corporation of Delaware
Filed Dec. 29, 1961, Ser. No. 163,173
7 Claims. (Cl. 222—182)

The present invention relates broadly to decorating devices, and is more particularly concerned with a novel package for applying food products to cakes and the like, featuring the combination of a pressurized container and a closure unit therefor having a central tubular cap member provided with a plurality of tubular nozzles integrally and separably connected thereto.

One well-known cake decorator takes the form of a tubular body threaded at one end to receive nozzle tips of varying orifice designs and closed at its opposite end with a centrally apertured threaded cap in which a piston rod is longitudinally slidable to exude the product onto the cake or other pastry. A device of this character, while relatively low in original cost, does have certain inherent disadvantages.

First, the confectionary icing must be prepared on a single use basis as it air hardens if stored. The cake baking procedure is thereby lengthened, and of course, formulation of the icing is a somewhat messy task. Second, the bowls, decorating kit and any other utensils used must be thoroughly cleansed after the icing has been applied, again adding to the time required to bake the cake. Third, the amount of icing exuded depends in part on the force applied to the piston rod and may not at all times be uniform. Other disadvantages of this structure are known to those skilled in the art.

It is accordingly an important aim of the present invention to avoid these and other known objections to currently used devices by provision of a pressurized decorator package which applies food products in a simple, efficient and sanitary manner.

Another object of this invention is to provide a decorator for cakes and the like comprised of a pressurized container having a dispensing valve at one end thereof and a closure unit including a central cap member closing the valve and a cluster of tubular nozzles integrally and separably connected to the cap member and adapted to be selectively received on the dispensing valve.

Still another object of the instant invention lies in the provision of a decorator of the foregoing character, in which the cap and nozzle members are equipped with internal projections for snappable engagement with external threads on the valve, effecting a firm removable attachment therewith and further eliminating costly unscrewing molds.

A further object of the invention is to provide a device for decorating cakes and the like, comprising a pressurized container having a tubular rockable valve member at one end thereof and a closure unit including a central tubular cap member and a plurality of tubular nozzle members outwardly of said cap member integrally and separably connected thereto for selective mounting upon said valve member.

Other objects and advantages of the invention will become more apparent as the description proceeds, particularly when taken in connection with the accompanying drawings.

In the drawings, wherein like numerals are employed to designate like parts throughout the same:

FIGURE 1 is a side elevational view of a container constructed in accordance with the principles of this invention, with parts broken away and with parts taken in section to more fully illustrate certain details thereof;

FIGURE 2 is a top plan view of the container with the overcap removed;

FIGURE 3 is a top plan view of the cap and nozzle unit in its entirety;

FIGURE 4 is a view similar to FIGURE 3 with one nozzle member removed at its point of weakened juncture with the central cap;

FIGURE 5 is a vertical sectional view taken substantially along the line 5—5 of FIGURE 3;

FIGURE 6 is a fragmentary side elevational view of the container with one separated nozzle member seated upon the container valve; and FIGURE 7 is a view similar to FIGURE 6, but substantially enlarged and with the nozzle member taken in section.

Referring now to the drawings, there is designated therein generally by the legend C a container assembly constructed in accordance with the novel concepts of this invention, and comprising in its broader aspects a container body 11 and a closure unit 12 therefor including a central tubular cap member 13 and a plurality of tubular nozzle members 14a–d integrally and separably connected thereto. While forming no part of the instant invention, the closure unit 12 may be protected and the area of container body shoulder 15 cushioned by an overcap 16 having a generally dome-like body portion 16a and a depending skirt portion 16b which embraces the shoulder area. The overcap may be vacuum or pressure formed of cellulose acetate or any plastic material, and while it is shown as transparent in order to facilitate a showing of its positioning with respect to the container body 11, in actual practice it would be suitably colored to enhance the decorative appearance of the package C.

The container body 11 may be of extruded construction or of the side seam sheet metal type formed of lead, aluminum or aluminum alloys, or if cost considerations can be somewhat overlooked, tin and other materials may be used. The body 11 has a sheet metal closure disc 17 double seamed to the can body bottom flange (not shown) in a manner well known to the art, and at its opposite end the container body embodies an integral breast portion 18 terminating in an annular neck bead 19, the bead having rolled or otherwise provided therein a mounting cup 20 supporting a tubular rockable or tiltable valve member 21 (FIGURES 6 and 7).

The assembly further includes a piston 23 which is slideable in the can body 11 and is preferably of an impervious synthetic thermoplastic exemplified by polyethylene, which is molded in the shape of downwardly opening cup. The piston side wall or skirt preferably has a slight upward taper as shown and is dimensioned to provide an initial minute, accurately determined clearance between its extreme lower lip and the can wall 11 to admit therebetween a thin film of product P which the can is designed to contain, whereby to provide not only a lubricating action promoting free piston movement, but also a sealing action to avoid migration of propellant gas G around the piston and into the product P.

The closure disc 17 has a central opening 25 for charging the container with pressurized prospellant gas G, and a resilient plug 26 is provided for sealing the opening 25 when gas charging is completed.

The assembly and filling of the container C is normally accomplished by first inserting the piston 23 into the can and then seaming the end member 17 into place on the open end of the body 11. Product P is then introduced through the neck of the can, whereupon the mounting cup 20 with its valve 21 is placed on the neck of the can and crimped about the bead 19. Thereafter propellant gas G under pressure is introduced beneath the piston 23 through the opening 25, and when the pressure reaches the proper value, a plug 26 is driven into the opening, to seal the same. The closure unit 12 is then placed in position as shown in FIGURES 1 and 2, and the overcap 16 located thereover with its skirt portion 16b embracing the upper end of the can body 11 closely adjacent the shoulder portion 15 thereof.

In accordance with the novel concepts of this invention, each of the earlier named disadvantages of currently employed cake decorators is herein eliminated by provision of a closure and dispensing unit 12 in combination with a pressurized container constructed substantially as shown and just described, although it will be appreciated that the preferred form of piston disclosed is not at all times essential to practice of the invention. As was also earlier noted, the unit 12 embodies a central tubular cap member 13, and clustered thereabout, a plurality of tubular nozzle members 14a–d integrally and separably connected to the cap member, and in common with the latter member, constructed so as to snap upon the container valve member 21.

The central cap member 13 is generally cylindrical throughout its length and is closed at one end by wall 13a. The cap is sized internally so as to snap readily onto the valve 21, and desirably has a length such that the cap end wall 13a bears against dispensing orifice 21a (FIGURE 7) of the valve member to minimize hardening of the product P in the valve bore 21b.

Molded integrally with the central cap 13, and a preferred material therefor is polystyrene, are the nozzle members 14a–d. As shown, the nozzles and cap are connected by radially outwardly directed arm members 30a–d extending from the lower or opposite end of the cap member and joining the nozzle members 14 generally midway of their axial lengths. In this manner, the lower ends of the nozzles extend axially beyond the lower end of the cap member 13 so that when the cluster 12 is seated in the position of FIGURES 1 and 2, the lower ends of the nozzles 14 rest upon the annular upper surface of the mounting cup 20 in circumferentially spaced relation therealong. At the same time, the central cap 13 is received upon the valve 21 and prevents substantial air ingress thereto.

The radially directed arm members 30 are axially scored or grooved on at least one surface thereof, as indicated at 31, to facilitate the separation or breaking away of one or more of the nozzle members 14 prior to the pastry decorating operation, in a manner to be shortly described. Further, to aid in locating either the clustered unit 12, or one nozzle thereof, upon the valve member 21 each nozzle member 14 is molded or otherwise formed with finger manipulable means 32, which may take the form of an axially extending rib.

Each nozzle 14a–d is shaped to provide a generally cylindrical body portion 33a–d and a substantially conical tip portion 34a–d, each terminating in a dispensing orifice 35a–d of predetermined configuration. The shape of the discharge mouths 35 may of course be widely varied; however, in the exemplary arrangement provided for decorating cakes, the orifice 35a is of star configuration to make decorative stars and flowers with the viscous product P. The orifices 35b and 35c, on the other hand, are circular and of different diameters for producing letters, dots, lines and stems. Further, the orifice 35d is somewhat leaf-shaped and provides a leaf or but on the pastry. Of course, the number of nozzles as well as their orifice configurations can be quite different from those illustrated.

Internally of the cap member 13 and nozzle members 14 simplified and reliable means are provided for effecting engagement with thread means 21c formed externally on the tubular rockable valve member 21. Such means are indicated at 40 and 41 in the drawings and take the form of two pairs of radially inwardly directed, diametrally opposed and obliquely arranged protuberances or projections. These raised surfaces are formed upon the inner diameter of the cap and nozzle members 13 and 14 during the integral molding thereof, and have the important advantage of eliminating the need for an unscrewing mold, which if required, would render the cost of closure unit prohibitive in large scale production. And yet, the projections provide firm engagement with the side surfaces of the external threads 21c on the valve, as shown in FIGURE 7, and equally importantly, it is merely necessary to depress the cap or nozzle upon the valve to achieve a firm removable snap-in-place connection therewith which cannot be inadvertently released during manipulation of the container assembly C.

To operate the container assembly C of FIGURE 1, the overcap 16 is removed and the closure and dispensing unit 12 withdrawn from its position upon the container valve 21. As is now believed manifest from the foregoing description, when the container is closed with the cap member 13 seated upon the dispensing valve 21, the cap lugs or projections 40 and 41 are closely received within the grooves between the double lead-in thread 21c, and the cap top wall 13a is desirably overlying the valve orifice 21a to provide a seal thereupon.

Depending upon the design to be made upon the cake or other pastry, one of the nozzle members 14 is separated from the central cap 13 along the weakened juncture 31 therewith. Illustratively in FIGURES 3, 4, 6 and 7 the nozzle 14c is removed for purposes of decorating the cake with letters, dots, lines or flower stems. Accordingly, the body portion 33c of the nozzle 14c is grasped while retaining a hold on the remainder of the unit 12, and the body 33c twisted back and forth until the joint 31 is fractured and the nozzle 14c removed, as is portrayed in FIGURE 4.

The separated nozzle is thereupon depressably inserted upon the valve stem 21, and during this procedure the lugs 40 and 41 snap over the threads 21c until the lugs are finally engaged in the manner of FIGURE 7. In this final position it may be noted that the lower end of the nozzle body portion 33c slightly overhangs and is seated upon conical upper portion 45a of valve base 45. Thereafter, with the container body 11 partially inverted, the valve stem 21 is pressed to the side by finger action to discharge the product P through the nozzle orifice 35c, this occurring by reason of the force exerted on the product as the piston 23 moves upwardly by pressure of the propellant G thereagainst.

It is believed clear from the foregoing that applicant has provided a decorating package which operates in a simple, efficient and sanitary manner. The package comprises a pressurized container in combination with a closure and dispensing unit provided by a central tubular cap to which is integrally and separably connected unitarily molded tubular nozzle members. The juncture between each nozzle and the radially inwardly positioned cap is weakened to permit ready separation, although it is possible with some sacrifice in the convenience of manipulation of the valve to retain all nozzles in integrally molded relation upon the central cap during the decorating procedure. And as has additionally been brought out above, the cap and nozzle members are internally configured in a particular manner to effect a speedy and reliable snap engagement with the container valve.

Various modifications have been discussed in the preceding paragraphs, and these and other changes can of course be made without departing from the novel concepts of the present invention.

We claim:

1. A device for decorating cakes and the like, comprising a pressurized container, a mounting cup closing one end of said container, valve means including an upstanding nozzle supported by said mounting cup, a central tubular cap member enclosing said valve means and normally engaging the end of said nozzle during storage of said container, and a plurality of tubular nozzle members molded to said cap member and extending radially outwardly therefrom, said nozzle members being separable from said cap member for selective seating upon said valve nozzle after removal of said cap member, and said nozzle members being disposed upon said mounting cup when said cap member is seated upon said valve means and prior to separation from said cap member.

2. A device for decorating cakes and the like, comprising a pressurized container having an upstanding externally threaded tubular valve member at one end thereof, and a closure unit mounted by said valve member and including a removable tubular cap member enclosing said valve member and a plurality of tubular nozzle members integrally and separably connected to said cap member, said nozzle members being selectively mountable on said valve member after removal of said cap member, and spaced protuberances on the inner diameter of said cap and nozzle members selectively snappably engageable with the threads on said valve member and effecting a firm removable connection therewith.

3. A device for decorating cakes and the like, comprising a pressurized container having an upstanding externally threaded tubular valve member at one end thereof, and a closure unit mounted by said valve member and including a removable tubular cap member enclosing said valve member and a plurality of tubular nozzle members integrally and separably connected to said cap member, and a plurality of circumferentially spaced and diagonally disposed raised surfaces on the inner diameter of said cap and nozzle members for snappably engaging the threads on said valve member when said cap member or a particular separated nozzle member is inserted upon said valve member, said nozzle members normally resting on said one end of said container and said cap member normally resting against the top of said valve member.

4. A device for decorating cakes and the like, comprising a pressurized container having a valve member at one end thereof, and a closure unit removably mounted by said valve member and including a central tubular cap member, a plurality of tubular nozzle members selectively mountable on said valve member after removal of said cap member, and a radially outwardly extending arm member having an axial groove therein integrally connecting one end of said cap member to each of said nozzle members substantially midway of the axial length thereof, said groove providing a weakened juncture and permitting forcible separation of said nozzle members from said cap member.

5. A device for decorating cakes and the like, comprising a pressurized container having an upstanding externally threaded tubular valve member at one end thereof, a central tubular cap member received on said valve member during storage of said container, a plurality of circumferentially spaced tubular nozzle members separable from said cap member and selectively mountable on said valve member after removal of said cap member, a radially outwardly extending arm member having an axial groove therein integrally connecting one end of said cap member to each of said nozzle members along the axial length thereof, said groove providing a weakened juncture and permitting forcible separation of said nozzle members from said cap member, and a plurality of circumferentially spaced and diagonally disposed raised surfaces on the inner diameter of said cap and nozzle members for snappably engaging the threads on said valve member when said cap member or a particular separated nozzle member is inserted upon said valve member.

6. A closure and dispensing unit for use with a pressurized container having an upstanding externally threaded valve member at one end thereof, said unit comprising a central tubular cap member received on said valve member and enclosing the top thereof during storage of said container, a plurality of circumferentially spaced tubular nozzle members normally resting on said end of said container, a radially outwardly extending arm member having an axial groove therein integrally connecting the bottom end of said cap member to each of said nozzle members substantially midway of the axial length thereof, said groove providing a weakened juncture and permitting forcible separation of said nozzle members from said cap member, and a plurality of circumferentially spaced and diagonally disposed raised surfaces on the inner diameter of said cap and nozzle members for snappably engaging the threads on said valve member when said cap member or a particular separated nozzle member is inserted upon said valve member.

7. A closure and dispensing unit for use with a container having an end member mounting a dispensing spout, said unit comprising a central tubular cap member, a cluster of nozzles having diverse geometric apertures spaced about said cap member, and a plurality of narrow, manually fracturable arms radiating outwardly from said cap member each of which integrally connects with an individual nozzle, said nozzles having cylindrical portions extending equally beyond the open end of said cap member providing planar surfaces at their lower ends seatable upon the end member of the container around said spout when said cap member is installed on said spout, said cylindrical portions and said cap member having substantially equal internal diameters each providing relatively snug enclosing engagement with said spout when selectively installed thereon and having like internal connective means each providing positive securement with the exterior of said spout for convenient installation and removal.

References Cited by the Examiner
UNITED STATES PATENTS

| | | | |
|---|---|---|---|
| 2,660,132 | 11/53 | Pyenson | 107—14 |
| 2,761,598 | 9/56 | Darlington | 222—541 |
| 2,792,975 | 5/57 | Yorker | 222—498 |
| 2,944,705 | 7/60 | Strumor | 222—545 X |
| 2,945,494 | 7/60 | Bowen. | |
| 2,968,262 | 1/61 | Lacey | 222—575 X |
| 3,022,923 | 2/62 | Hoffman | 221—389 X |

FOREIGN PATENTS 553,068  5/43  Great Britain.

RAPHAEL M. LUPO, Primary Examiner.
LAVERNE D. GEIGER, Examiner.